(12) United States Patent
Tung et al.

(10) Patent No.: US 7,954,514 B2
(45) Date of Patent: Jun. 7, 2011

(54) AIR-ADMITTING GUIDE MEMBER

(76) Inventors: Chun-Shuo Tung, Taipei (TW);
Hsien-Chih Wang, Taipei (TW)

( * ) Notice: Subject to any disclaimer, the term of this patent is extended or adjusted under 35 U.S.C. 154(b) by 0 days.

(21) Appl. No.: 12/570,446

(22) Filed: Sep. 30, 2009

(65) Prior Publication Data

US 2011/0073207 A1    Mar. 31, 2011

(51) Int. Cl.
*F15D 1/04* (2006.01)
(52) U.S. Cl. .............. 138/37; 138/39; 138/44; 366/338
(58) Field of Classification Search .................. 138/37, 138/39, 44; 366/338, 339
See application file for complete search history.

(56) References Cited

U.S. PATENT DOCUMENTS

| | | | | |
|---|---|---|---|---|
| 4,208,136 A | * | 6/1980 | King | 366/338 |
| 4,614,440 A | * | 9/1986 | King | 366/336 |
| 4,848,920 A | * | 7/1989 | Heathe et al. | 366/339 |
| 5,489,154 A | * | 2/1996 | Algreen-Ussing | 366/338 |
| 6,848,477 B2 | * | 2/2005 | Treusch et al. | 138/44 |
| 2003/0178077 A1 | * | 9/2003 | Ramirez-Rivera | 138/44 |
| 2005/0039809 A1 | * | 2/2005 | Speldrich | 138/39 |

* cited by examiner

*Primary Examiner* — Patrick F Brinson (57) ABSTRACT

An air-admitting guide member comprises an inflow end; an outflow end disposed on an inlet of a mechanical device; an elongated straight flow hole defined between the inflow and outflow ends; a plurality of rotational flow holes spaced apart respectively and each being defined between the inflow end and the outflow end, a diameter of the rotational flow hole being more than that of the straight flow hole and a bottom end thereof flushing with an end surface of the outflow end, the outflow end including a plurality of annular bores arranged on the end surface thereof and formed in a swirl shape toward the inflow end, an inner wall of the inflow end being formed in a tilted arc shape and including a stream-line sector end portion, the rotational flow hole including two openings arranged on two ends thereof individually, and projected shadows of the openings overlapping each other.

4 Claims, 8 Drawing Sheets

AIR-ADMITTING GUIDE MEMBER

BACKGROUND OF THE INVENTION

1. Field of the Invention

The present invention relates to an air-admitting guide member, and more particularly an air-admitting guide member installed to an air flowing portion of a mechanical device that can change the form of the air flow and generate a spiral flowing effect to flow air quickly, thereby saving oil and increasing power.

2. Description of the Prior

A conventional air-admitting guide tube is hollow and installed to an air flowing portion of a mechanical device, such as an internal combustion engine, to feed air, therefore the flowing amount and speed will affect the service life and power of the combustion engine.

Unfortunately, the air flowing into the internal combustion engine can not be burned completely and pulled, thereby causing slow flowing to decrease power and increase damage. Besides, the hollow air-admitting member will make air impact in an air offset tube to increase obstruction in a combustion room.

The present invention has arisen to mitigate and/or obviate the afore-described disadvantages.

SUMMARY OF THE INVENTION

The primary object of the present invention is to provide an air-admitting guide member that can change the form of the air flow and generate a spiral flowing effect to flow air quickly, thereby saving oil and increasing power.

An air-admitting guide member according to a preferred embodiment of the present invention comprises:

an inflow end, an outflow end, a straight flow hole, and four rotational flow holes.

The outflow end is disposed on an inlet of the mechanical device to flow air into the mechanical device.

The straight flow hole is an elongated hole and defined between the inflow end and the outflow end and located at an axial center of a post member.

The rotational flow holes are spaced apart respectively and each being defined between the inflow end and the outflow end, a diameter of each rotational flow hole is more than that of the straight flow hole, a bottom end of each rotational flow hole flushes with an end surface of the outflow end, and the outflow end includes a plurality of annular bores arranged on the end surface thereof and formed in a swirl shape toward the inflow end, and an inner wall of the inflow end is formed in a tilted arc shape and includes an end portion formed in a stream-line sector shape, each rotational flow hole includes two openings arranged on two ends thereof individually, and projected shadows of the openings overlap partially.

In operation, air is fed to the inflow end so that the air impacts the inner wall of the inflow end and flows to the rotational flow hole along the inner wall of the inflow end, such that the air flow is guided to form a spiral air to enter a combustion room so as to enhance energy.

In addition, as the air flow enters the hollow straight flow hole, a pulling effect generates to pull the spiral air flow so as to prevent the air from collision, hence an irregular path is formed to increase obstruction.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
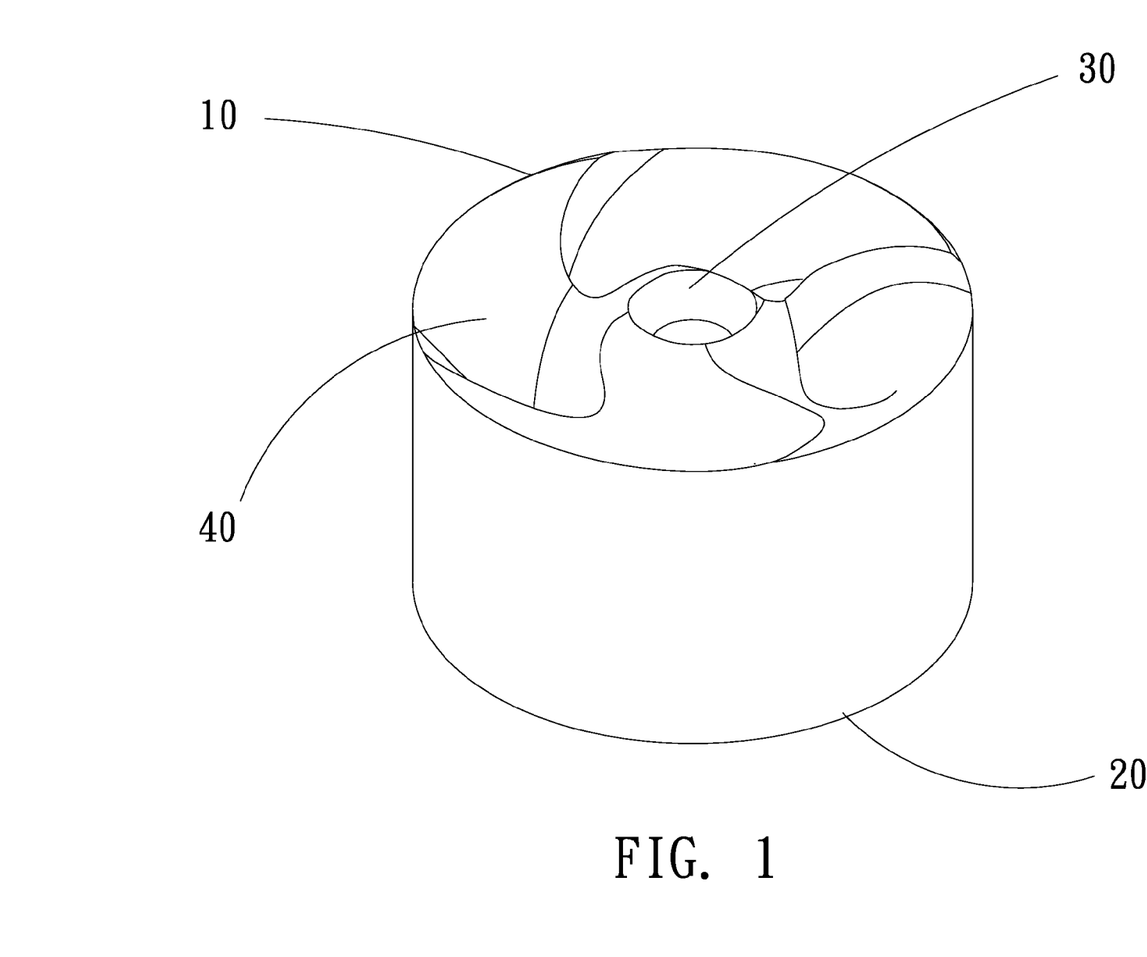
FIG. 1 is a perspective view showing the assembly of an air-admitting guide member in accordance with a preferred embodiment of the present invention.
Figure 2:
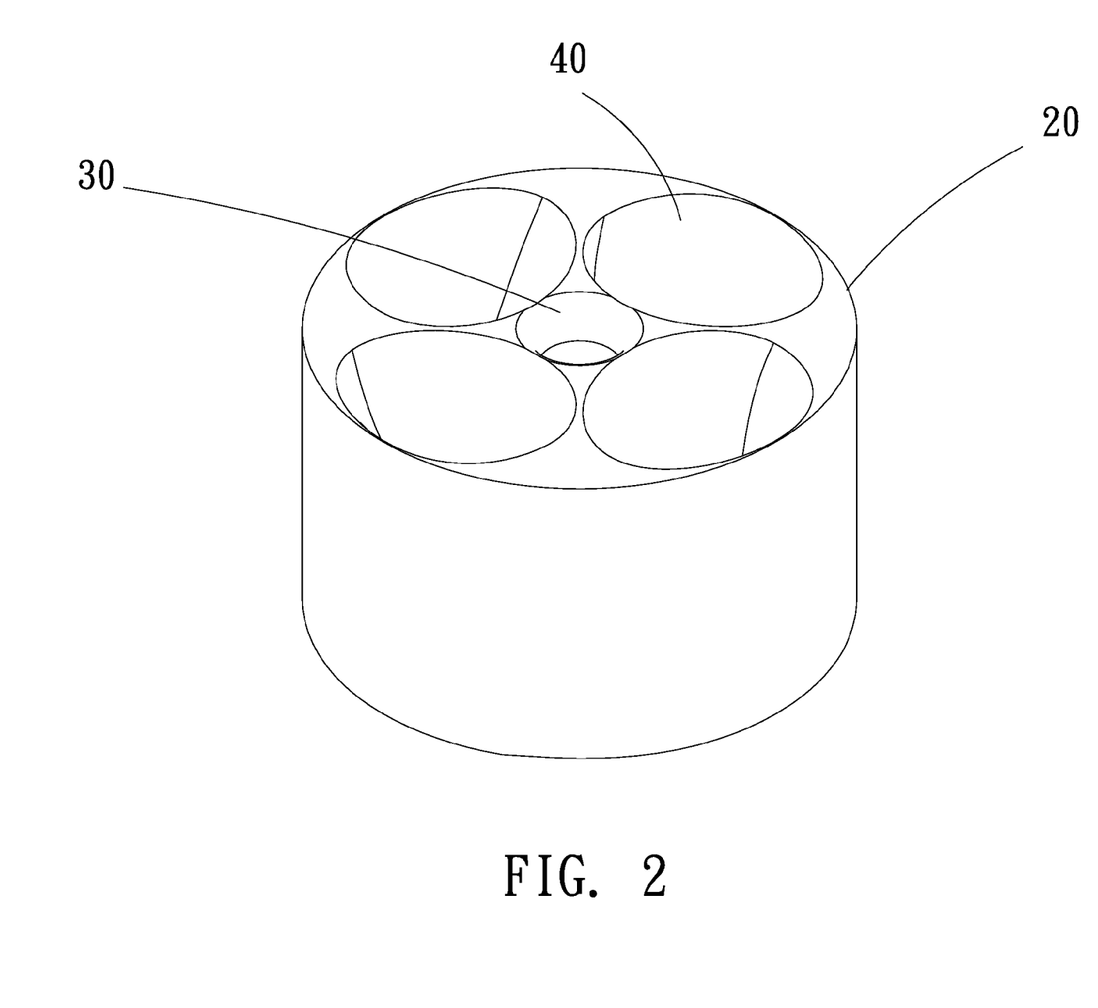
FIG. 2 is another perspective view showing the assembly of the air-admitting guide member in accordance with the preferred embodiment of the present invention.
Figure 3:
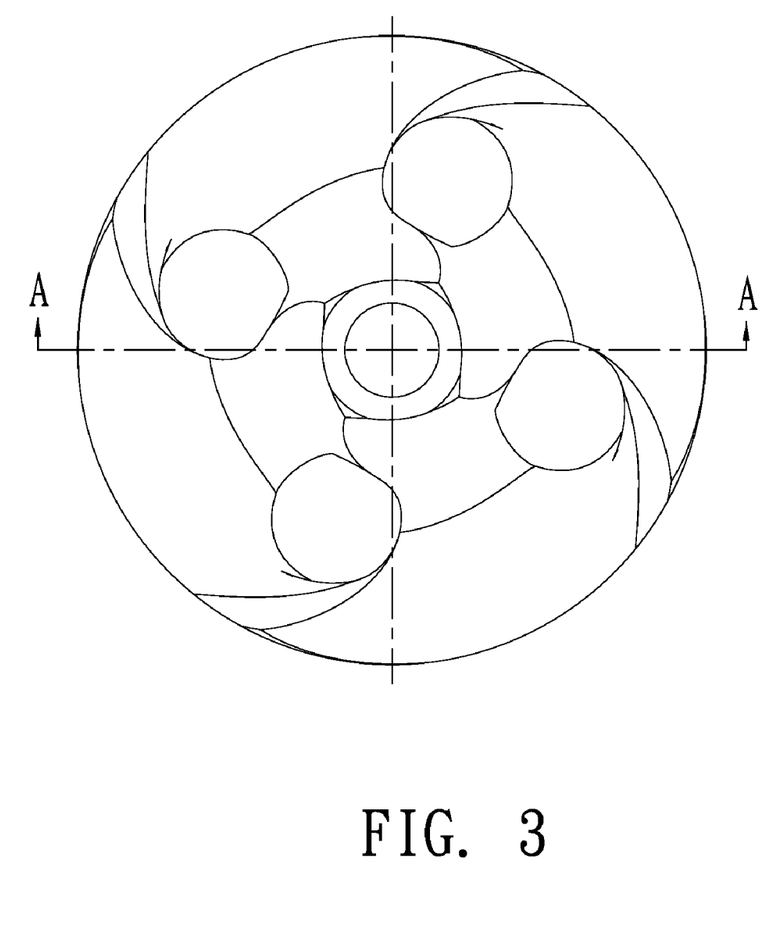
FIG. 3 is a top plan view of an inflow end of the air-admitting guide member in accordance with the preferred embodiment of the present invention.
Figure 4:
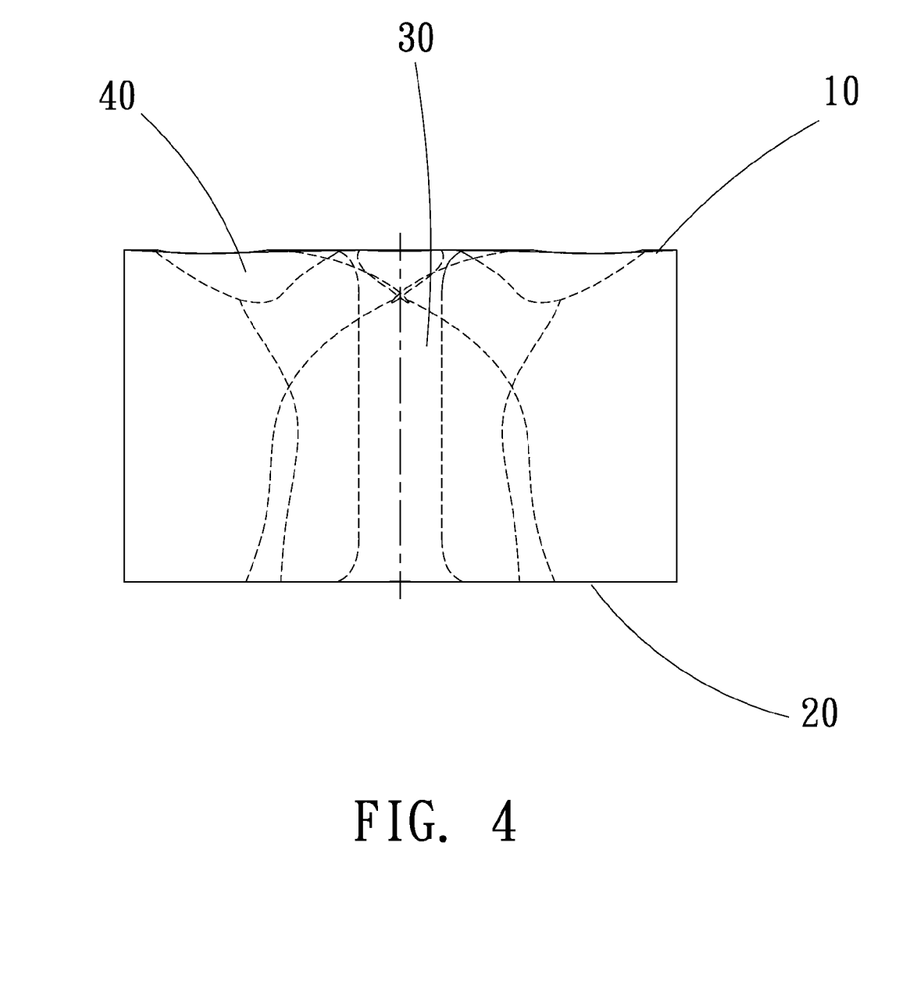
FIG. 4 is a side plan view of the air-admitting guide member in accordance with the preferred embodiment of the present invention.
Figure 5:
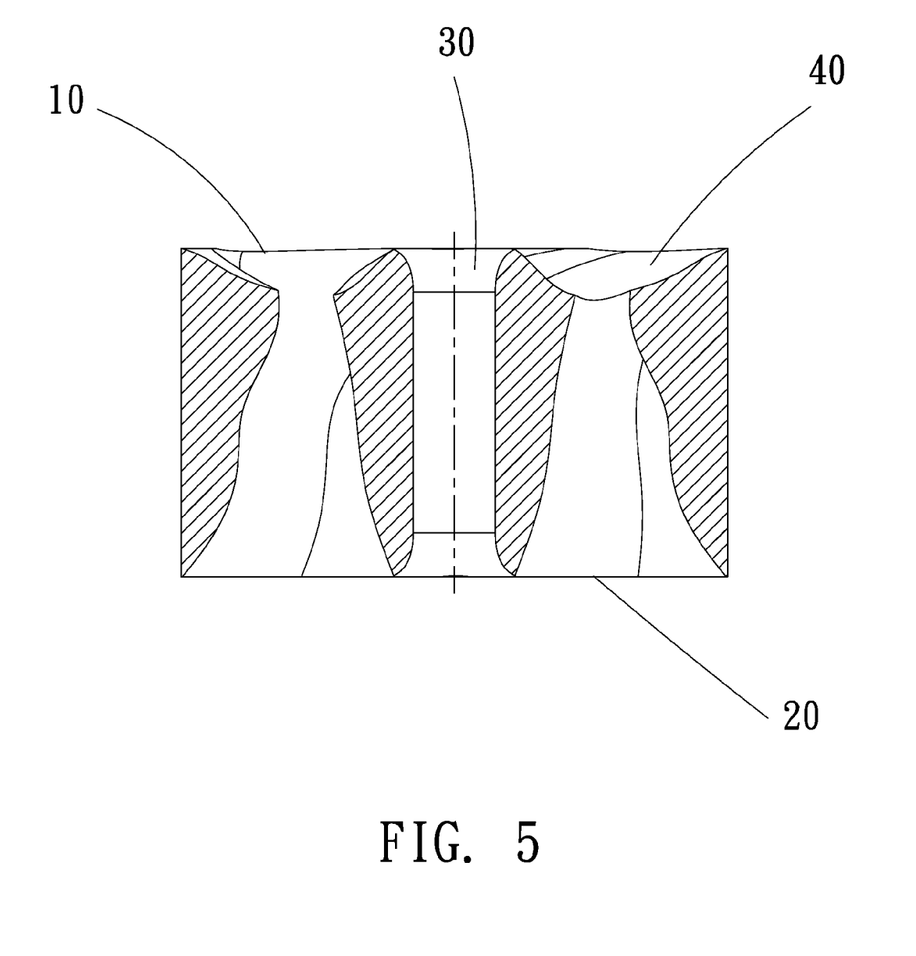
FIG. 5 is a cross sectional view of the air-admitting guide member in accordance with the preferred embodiment of the present invention.
Figure 6:
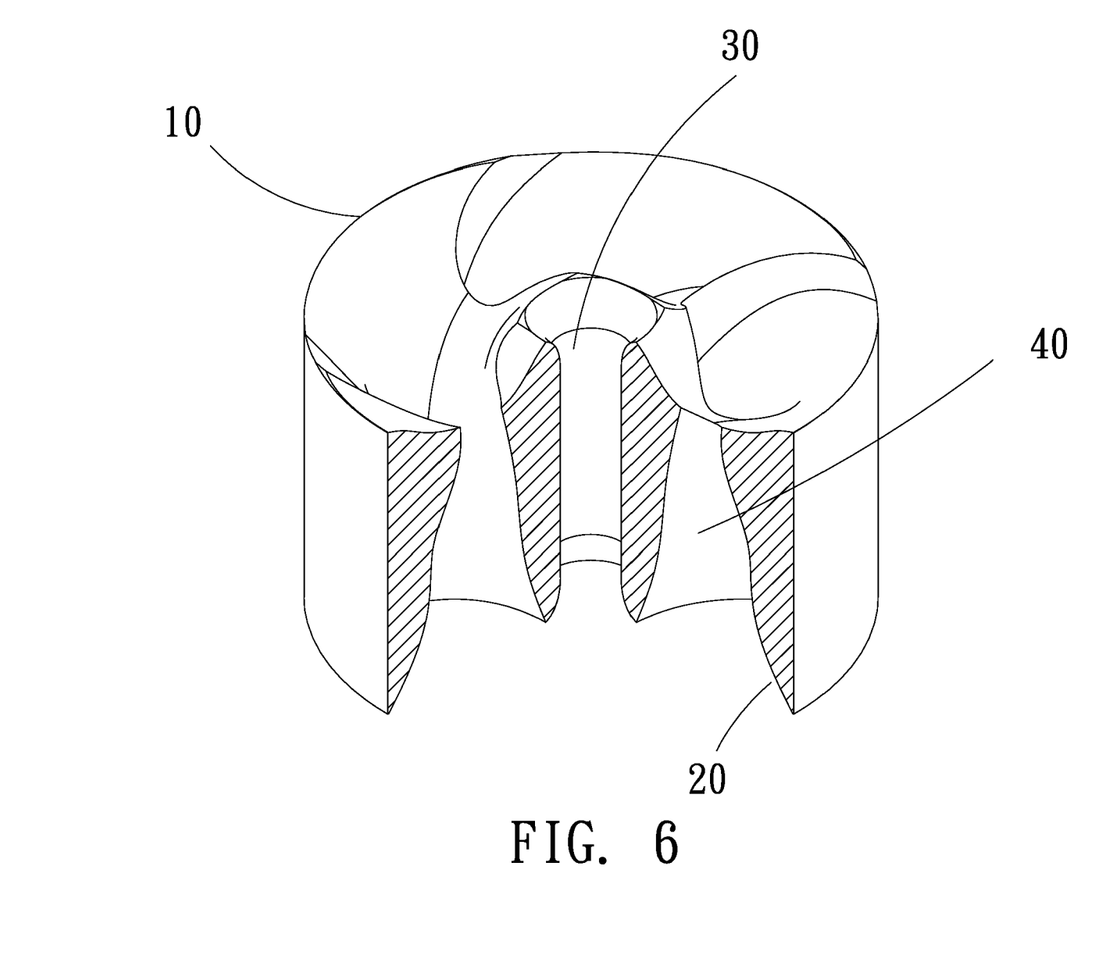
FIG. 6 is a partial perspective view of the air-admitting guide member in accordance with the preferred embodiment of the present invention.
Figure 7:
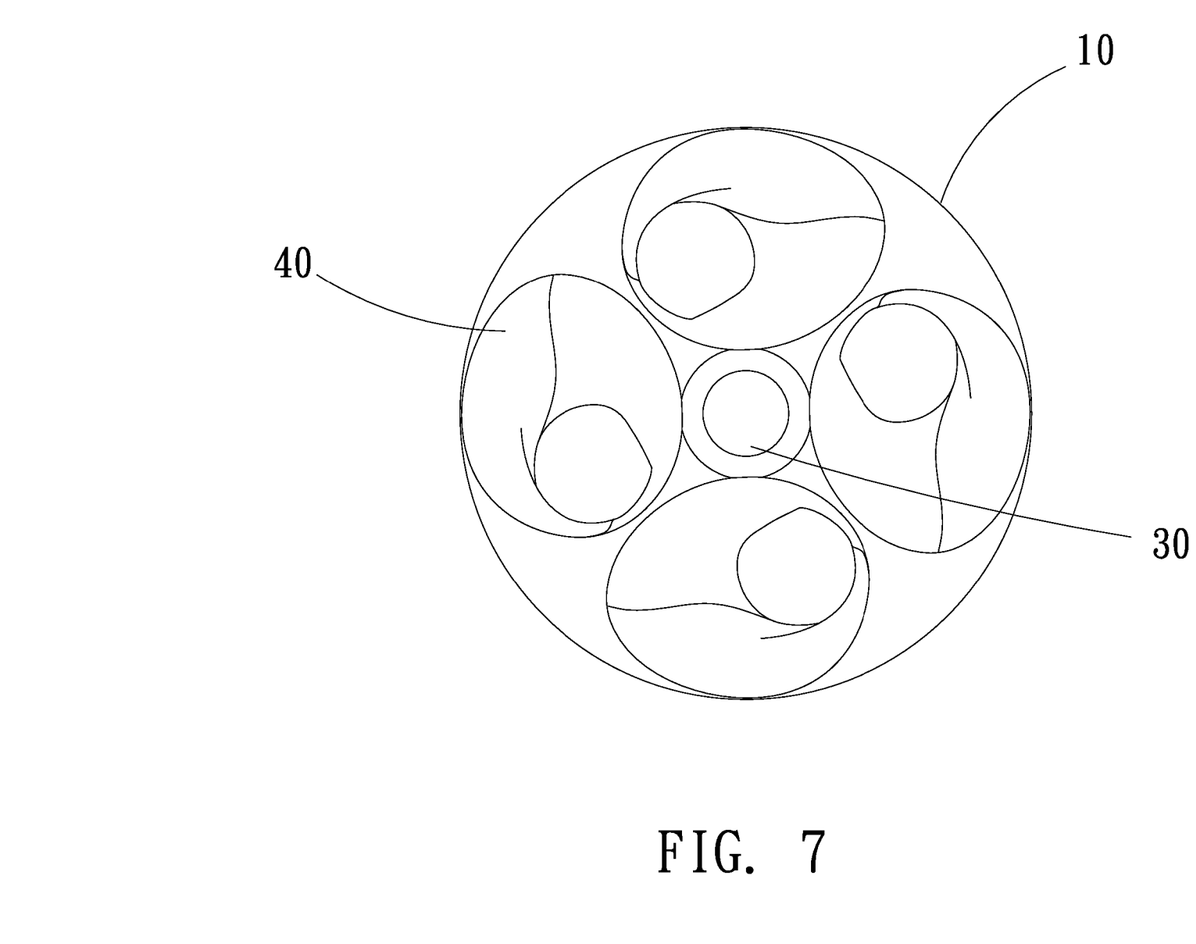
FIG. 7 is a top plan view of an outflow end of the air-admitting guide member in accordance with the preferred embodiment of the present invention.
Figure 8:
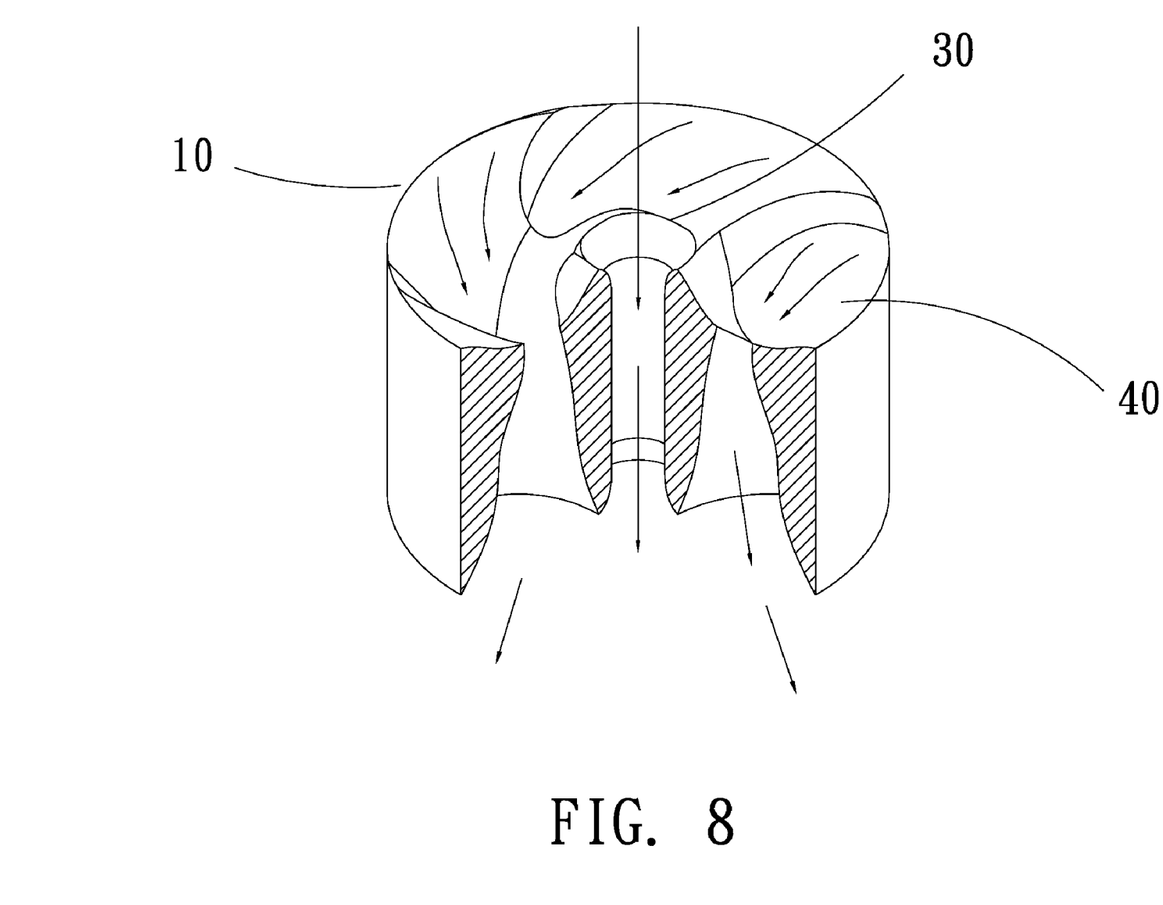
FIG. 8 is another partial perspective view of the air-admitting guide member in accordance with the preferred embodiment of the present invention.

Referring to FIGS. 1-8, an air-admitting guide member according to a preferred embodiment of the present invention is installed to an air flowing portion of a mechanical device (such as an internal combustion engine) and comprises an inflow end 10, an outflow end 20, a straight flow hole 30, and four rotational flow holes 40.

The outflow end 20 is disposed on an inlet of the mechanical device to flow air into the mechanical device.

The straight flow hole 30 is an elongated hole and defined between the inflow end 10 and the outflow end 20 and located at an axial center of a post member.

The rotational flow holes 40 are spaced apart respectively and each being defined between the inflow end 10 and the outflow end 20, and a diameter of each rotational flow hole 40 is more than that of the straight flow hole 30, a bottom end of each rotational flow hole 40 flushes with an end surface of the outflow end 20, and the outflow end 20 includes a plurality of annular bores arranged on the end surface thereof and formed in a swirl shape toward the inflow end 10, an inner wall of the inflow end 10 is formed in a tilted arc shape and includes an end portion formed in a stream-line sector shape, each rotational flow hole 40 includes two openings arranged on two ends thereof individually, and projected shadows of the openings overlap partially.

In operation, air is fed to the inflow end 10 so that the air impacts the inner wall of the inflow end 10 and flows to the rotational flow hole 40 along the inner wall of the inflow end 10, such that the air flow is guided to form a spiral air to enter a combustion room to enhance energy.

In addition, as the air flow enters the hollow straight flow hole 30, a pulling effect generates to pull the spiral air flow so as to prevent the air from collision, hence an irregular path is formed to increase obstruction. It is to be noted that the diameters of the four rotational flow holes 40 can be designed in different sizes to change flowing direction of the spiral air flow, enhancing spiral flowing force.

Therefore, the air-admitting guide member of the present invention can change the form of the air flow and generate a spiral flowing effect to flow air quickly, thus saving oil and increasing power.

While we have shown and described various embodiments in accordance with the present invention, it is clear to those skilled in the art that further embodiments may be made without departing from the scope of the present invention.

What is claimed is:

1. An air-admitting guide member being formed in a post shape and comprising:
    an inflow end;
    an outflow end opposite to the inflow end disposed on an inlet of a mechanical device;
    a straight flow hole formed in an elongated hole shape, defined between the inflow end and the outflow end and located at an axial center of the post;
    a plurality of rotational flow holes spaced apart respectively and each being defined between the inflow end and the outflow end, and a diameter of each rotational flow hole being more than that of the straight flow hole, a bottom end of each rotational flow hole flushing with an end surface of the outflow end, and the outflow end including a plurality of annular bores arranged on the end surface thereof and formed in a swirl shape toward the inflow end, and an inner wall of the inflow end being formed in a tilted arc shape and including an end portion formed in a stream-line sector shape, each rotational flow hole including two openings arranged on two ends thereof individually.

2. The air-admitting guide member as claimed in claim 1, wherein the number of the plurality of rotational flow holes is four.

3. The air-admitting guide member as claimed in claim 1, wherein the diameters of the rotational flow holes are of different sizes.

4. The air-admitting guide member as claimed in claim 2, wherein the diameters of the four rotational flow holes are of different sizes.

* * * * *